April 24, 1928.
F. G. BREMER
AUTOMOBILE BUMPER
Filed July 20, 1927
1,667,528
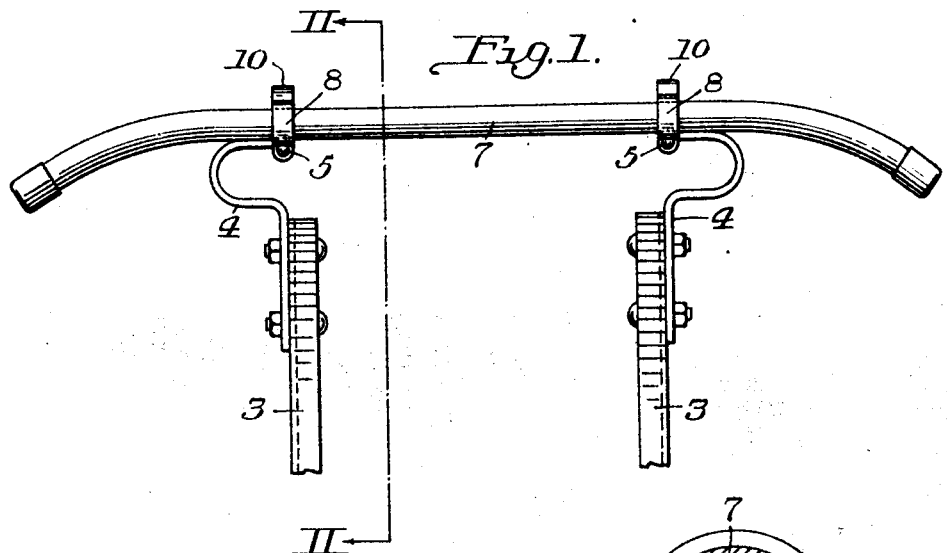
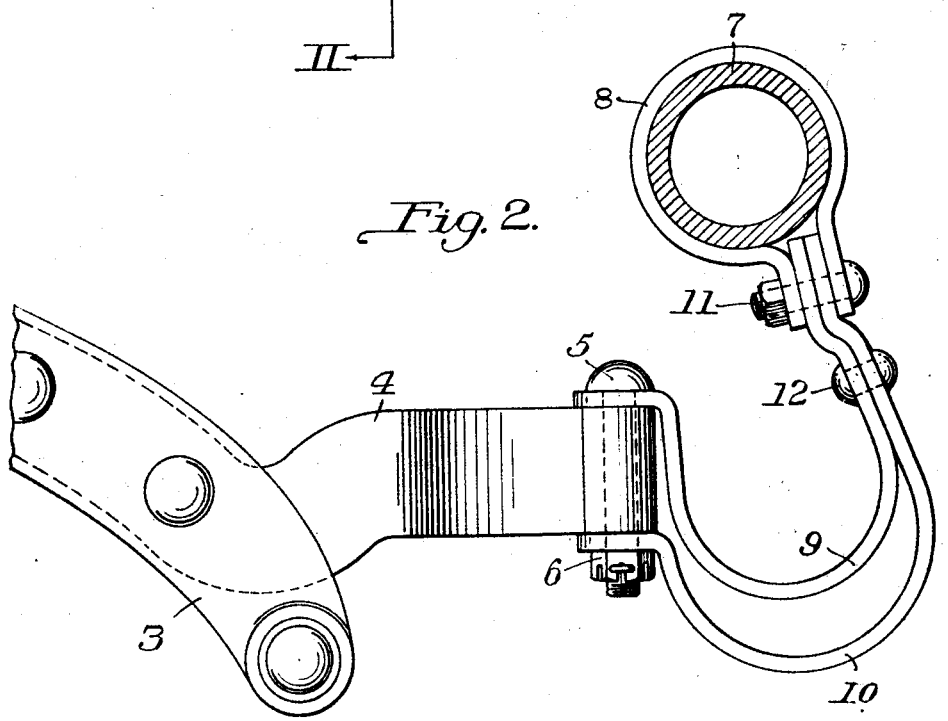
INVENTOR
Frederick G. Bremer
By Archworth Martin,
Attorney Patented Apr. 24, 1928.

1,667,528

UNITED STATES PATENT OFFICE.

FREDERICK G. BREMER, OF PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

AUTOMOBILE BUMPER.

Application filed July 20, 1927. Serial No. 207,176.

My invention relates to automobile bumper structures such as are employed at the front and rear ends of motor vehicles for absorbing the force of impacts.

One object of my invention is to provide an improved manner of yieldably supporting impact bars of the rigid type.

Another object of my invention is to provide an improved form of buffer springs for automobile bumpers.

One form which my invention may take is shown in the accompanying drawing, wherein Figure 1 is a plan view of the bumper structure mounted upon the forward portion of a vehicle frame, and Fig. 2 is a view, on an enlarged scale, taken on the line II—II of Fig. 1.

The numeral 3 represents the forward ends of the usual side frames of an automobile. Bracket arms 4, preferably of spring steel, are bolted or otherwise secured to the frame members 3 and are bent to curved form near their forward ends, in order to furnish greater resilience to take up shocks of collision.

The members 4 are curled at their outer ends to form eyes for the reception of pivot bolts 5, the distance between the heads of the bolts 5 and the normal position of their nuts 6 being greater than the width of the bracket arms 4.

An impact-receiving bar 7 which is shown as tubular in cross section, but which may be of various other forms, is supported to clamping collars 8, whose lower ends are spaced apart to receive the forward ends of buffer spring members 9 and 10 that are held in place by a clamping bolt 11, the rear ends of these members being held in place on the bracket arms 4 by the bolts 5, and preferably have slight pivotal movement thereon when the impact bar 7 is deflected in an endwise direction. The bracket arms 4 resist such deflection and, by reason of their resiliency, will return to their normal positions upon removal of the obstruction. Rivets 12 are provided for holding the spring members 9 and 10 in unitary relation, independently of the bolts 5 and 11. The spring-like members 9, 10 and 4 combine to form a yieldable impact-receiving structure of considerable resilience, and the shape of the springs 9 and 10 is such that the bar does not project forwardly of the vehicle frame a great distance compared to the length of the spring members. It is desirable to maintain the over-all length of the vehicle, including the bumper structures, within reasonable limits, without the sacrifice of capacity for absorbing impacts.

It will be seen that the members 9 and 10 supplement or reinforce one another, particularly at their upper ends, where the greatest strain comes, through tendency of the bar 7 to rock on its support when it engages an obstruction, and that the mounting of the rear ends of the spring members 9 and 10 in relatively spaced relation serves to brace such rear ends against distortion, in vertical planes. Furthermore, notwithstanding the number of spring elements employed and the pivotal connections afforded by the bolts 5 and 11 which permit deflections under certain conditions, without distortion of any one of the members, the form and arrangement of the spring members 4, 9 and 10 are such as to cause the parts to readily assume their normal positions upon removal of impact force from the buffer bar 7.

I claim as my invention:

1. Bumper structure comprising a bumper bar, two curved buffer springs connected at their outer ends to said bar, and means for pivotally connecting the inner ends of said springs to a vehicle frame, on vertical axes.

2. Bumper structure comprising a bumper bar, a curved buffer spring connected at its outer end to said bar, and means for pivotally connecting the inner end of such spring to a vehicle frame.

3. Bumper structure comprising a bumper bar, two pairs of curved buffer springs whose outer ends are in overlapping relation, means for connecting said outer ends of each pair to a bumper bar, and means for pivotally connecting the inner ends of each pair of said springs to a vehicle frame, the intermediate portions of each pair of the springs being spaced apart.

4. Bumper structure comprising a bumper bar, two pairs of curved buffer springs whose outer ends are in overlapping relation, means for connecting said outer ends of each pair to a bumper bar, and means for pivotally connecting the inner ends of each pair of said springs to a vehicle frame, the intermediate portions of each pair of the springs being spaced apart and curved on different radii.

5. Bumper structure comprising a bumper bar, two pairs of buffer springs connected at their outer ends to said bar, a support for the inner ends of each pair of springs, and means for connecting the inner ends of each pair of springs to the upper and lower sides, respectively, of one of the said supports.

6. Bumper structure comprising a pair of bracket arms for attachment to a vehicle frame, a buffer spring pivotally connected to the outer end of each of said arms, a buffer bar, and a connection between said bumper bar and each of said buffer springs.

7. Bumper structure comprising a pair of bracket arms for attachment to a vehicle frame, a pair of buffer spring members pivotally connected to each of said arms at the upper and lower sides of said arms, a bumper bar, and means for connecting the outer ends of each pair of buffer springs to the bumper bar.

8. Bumper structure comprising strap-like supporting arms of yieldable material and curved intermediate their ends, buffer springs connected to the forward ends of said arms, and a buffer bar connected to said buffer springs.

9. Bumper structure comprising supporting arms of yieldable material and curved intermediate their ends, buffer springs connected to the forward ends of said arms, and a buffer bar connected to said buffer springs, the said springs being curved in a plane at right angles to the planes in which the bracket arms are curved.

10. Bumper structure comprising supporting arms of yieldable material and curved intermediate their ends, buffer springs connected to the forward ends of said arms, and a buffer bar connected to said buffer springs, the bracket arms being curved in vertical planes, and the buffer springs being curved in horizontal planes.

11. Bumper structure comprising a bumper bar, buffer springs, said springs being curved in a vertical plane, means for connecting the forward ends of said springs to the bar, and means for pivotally connecting the rear ends of said springs to a vehicle for movement about vertical axes.

In testimony whereof, I, the said FREDERICK G. BREMER, have hereunto set my hand.

FREDERICK G. BREMER.